(12) United States Patent
Lutz

(10) Patent No.: US 10,452,044 B2
(45) Date of Patent: Oct. 22, 2019

(54) OPERATING SYSTEM AND METHOD FOR IDENTIFYING AND DISPLAYING OPERATOR ACCESSES TO PROCESS OBJECTS AND OPERATOR SYSTEM

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/180,740

(22) Filed: Nov. 5, 2018

(65) Prior Publication Data

US 2019/0137962 A1 May 9, 2019

(30) Foreign Application Priority Data

Nov. 6, 2017 (EP) .................................... 17200152

(51) Int. Cl.
*G05B 19/042* (2006.01)
*G05B 23/02* (2006.01)
*G06F 3/0482* (2013.01)

(52) U.S. Cl.
CPC ....... *G05B 19/042* (2013.01); *G05B 23/0267* (2013.01); *G06F 3/0482* (2013.01); *G05B 2219/23067* (2013.01); *G05B 2219/23255* (2013.01); *G05B 2219/23258* (2013.01); *G05B 2219/31478* (2013.01); *G05B 2219/31479* (2013.01)

(58) Field of Classification Search
CPC ........ G05B 19/042; G05B 2219/23067; G05B 2219/23255; G05B 2219/23258; G05B 2219/31478; G05B 2219/31479; G05B 23/0267; G06F 3/0482
See application file for complete search history.

(56) References Cited

U.S. PATENT DOCUMENTS

| 7,457,675 | B2 | 11/2008 | Vesel | |
|---|---|---|---|---|
| 2003/0107588 | A1* | 6/2003 | Elsbree | G06F 8/38 715/700 |
| 2005/0015624 | A1* | 1/2005 | Ginter | G06F 21/55 726/4 |
| 2007/0168065 | A1* | 7/2007 | Nixon | G06F 9/4488 700/83 |
| 2007/0239291 | A1* | 10/2007 | Wayland | G05B 23/0272 700/83 |
| 2010/0031199 | A1 | 2/2010 | Birzer et al. | |
| 2013/0021355 | A1 | 1/2013 | Ramarao et al. | |
| 2016/0266566 | A1* | 9/2016 | Lutz | G05B 19/056 |
| 2018/0114414 | A1* | 4/2018 | Law | G08B 5/22 |

FOREIGN PATENT DOCUMENTS

EP    2149825    2/2010

OTHER PUBLICATIONS

International Search Report based on EP 17200152 dated May 4, 2018.

\* cited by examiner

*Primary Examiner* — Andrea N Long
(74) *Attorney, Agent, or Firm* — Cozen O'Connor

(57) ABSTRACT

Operator System and method for identifying and displaying operator accesses to process objects within the scope of process management and process monitoring such that an efficient coordination of operator accesses is achieved.

8 Claims, 4 Drawing Sheets

OPERATING SYSTEM AND METHOD FOR IDENTIFYING AND DISPLAYING OPERATOR ACCESSES TO PROCESS OBJECTS AND OPERATOR SYSTEM

BACKGROUND OF THE INVENTION

1. Field of the Invention

The invention relates to an operator system and method for identifying and displaying operator accesses to process objects within the scope of process management and process monitoring.

2. Description of the Related Art

In process control engineering, typically hundreds of system images and several thousand process objects are to be processed, where a process object has several associated facets. For instance, a process image of a server of an operator system comprises process image modules associated with these process objects or operation- and monitoring-relevant process data of these process objects, an automation device comprises automation modules or control modules (CFCs, SFCs, . . . ) associated with the process objects and furthermore a user interface of a client of the operator system has block symbols of a system image associated with the process objects as well as what are known as faceplates, where the system images are provided for process monitoring and the faceplates are provided for process management or process operation.

The process objects of a technical system to be controlled, e.g., process objects in the form of measuring points, tanks, valves, sensors, actuators, . . . , and what are known as continuous function charts (CFCs) and sequence function charts (SFCs), are typically structured in what is known as an equipment hierarchy (EQH), where a user firstly produces this equipment hierarchy using suitable software of an engineering system. The equipment hierarchy produced in this way is then compiled via the engineering system and loaded into operator servers of operator systems of a process control system (Compile & Download), where during the run-time of the operator systems or the process control system, the equipment hierarchy is used as a central contact point, e.g., for a batch process or to navigate or determine a process object within the equipment hierarchy. The equipment hierarchy also has, aside from first nodes, which represent system images, also second nodes that represent the process objects. On the one hand, an operator can open the corresponding system image for representation on a display unit by selecting or clicking on a system image node and, on the other hand, can open a faceplate associated with this process object by selecting or clicking on a process object node, as a result of which the operator can operate the process object.

It is also possible, using a further "image hierarchy", to navigate in process control systems within the scope of a process operation and process monitoring. Each system image is represented hierarchically in the image hierarchy as a node and by selecting or clicking on this node, the system image is opened and displayed on the operator client, where a system image of this type comprises graphical image symbols and block symbols of the process objects.

To facilitate the navigation particularly in the event of process malfunctions, the hierarchies can be "dynamized" by alarm status information, which means that alarms that indicate the malfunctions in the process are displayed to the operators, such as in a system image, a block symbol of a process object, which sounds an alarm, also being displayed in the equipment and/or image hierarchy at corresponding nodes by an alarm symbol. As a result, an operator can intentionally open the system images having the "alarm-giving" block symbols of process objects or intentionally open the corresponding process object nodes, in order to be able to effect corresponding process operations.

As a result of typically hundreds of system images and thousands of process objects being available in a process control system, the image hierarchy and the equipment hierarchy are very comprehensive. Furthermore, numerous operators, often also separated spatially in various control rooms, are used for operating the system. As a result, it is very difficult for operators to coordinate themselves, particularly in exceptional circumstances if, in effect, a very large number of alarms sound and have to be processed at the same time to be able to move the system back into a safe state. Typically, the accesses or the processings are coordinated by way of current communication means (e-mail, telephone, . . . ). In order, in such an exceptional circumstance, to be able to transfer a system reliably and quickly back into the controlled operation, a coordination of this type is often defective and less efficient.

SUMMARY OF THE INVENTION

In view of the foregoing, it is therefore an object of the invention to provide a method via which an efficient coordination of operator accesses is permitted, as well as an operator system that is suitable for implementing the method.

This and other objects and advantages are achieved in accordance with the invention by a method and operator system in which the operations or actions by operators are advantageously automatically identified, assigned and visualized, as a result of which an optimized and automatically managed coordination of the operators is permitted in order to be able to efficiently and rapidly guide the system into a safe state. Consultations between operators via communication means are not required. Furthermore, multi-controls at the expense of the processing of still pending process alarms are avoided, as a result of which an efficient treatment of process control systems in exceptional circumstances is permitted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in greater detail below on the basis of the drawing in which an exemplary embodiment of the invention is illustrated, in which.

DETAILED DESCRIPTION OF THE EXEMPLARY EMBODIMENTS

Figure 1:
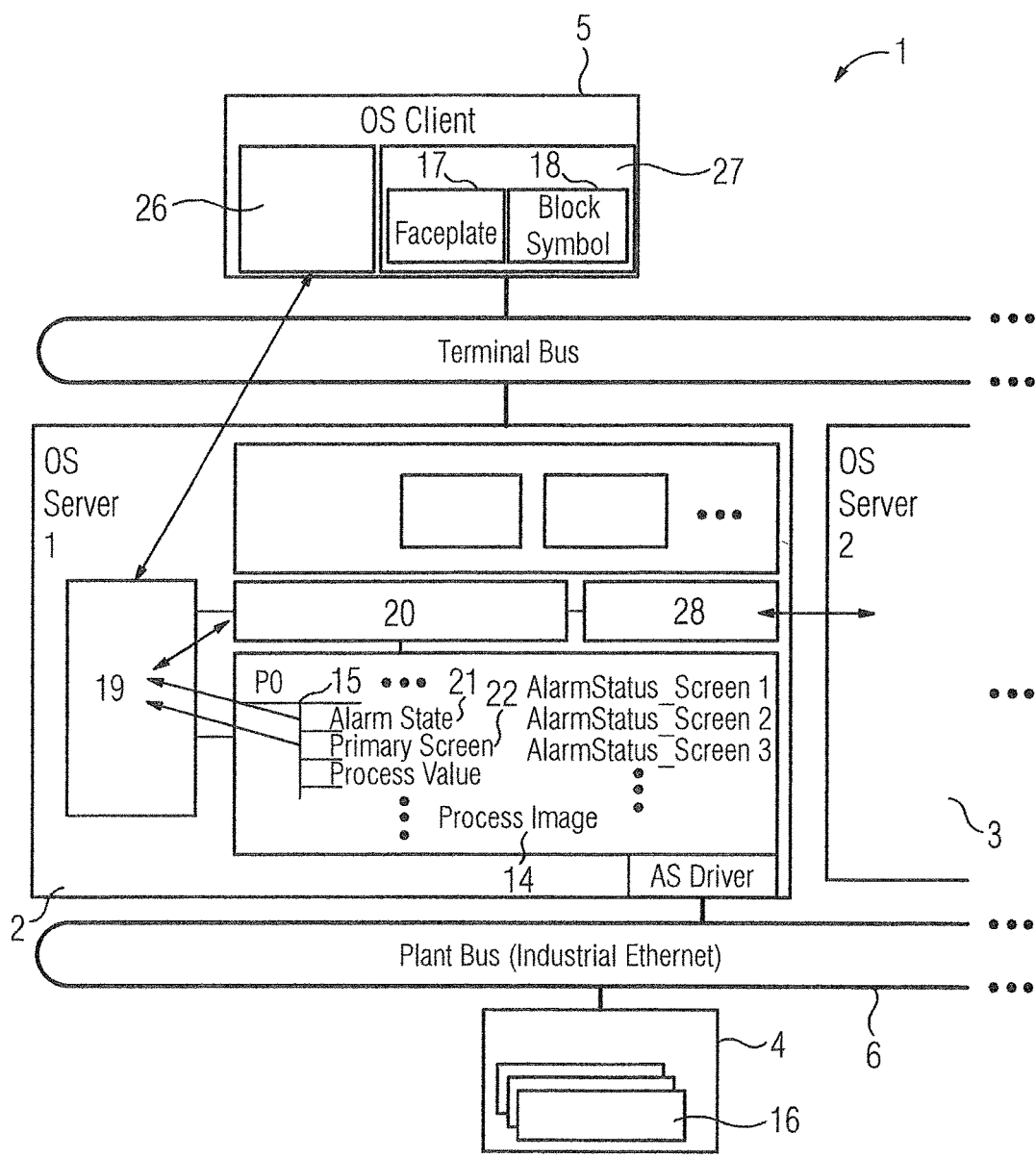
FIG. 1 shows components of a control system in accordance with the invention.
Figure 2:
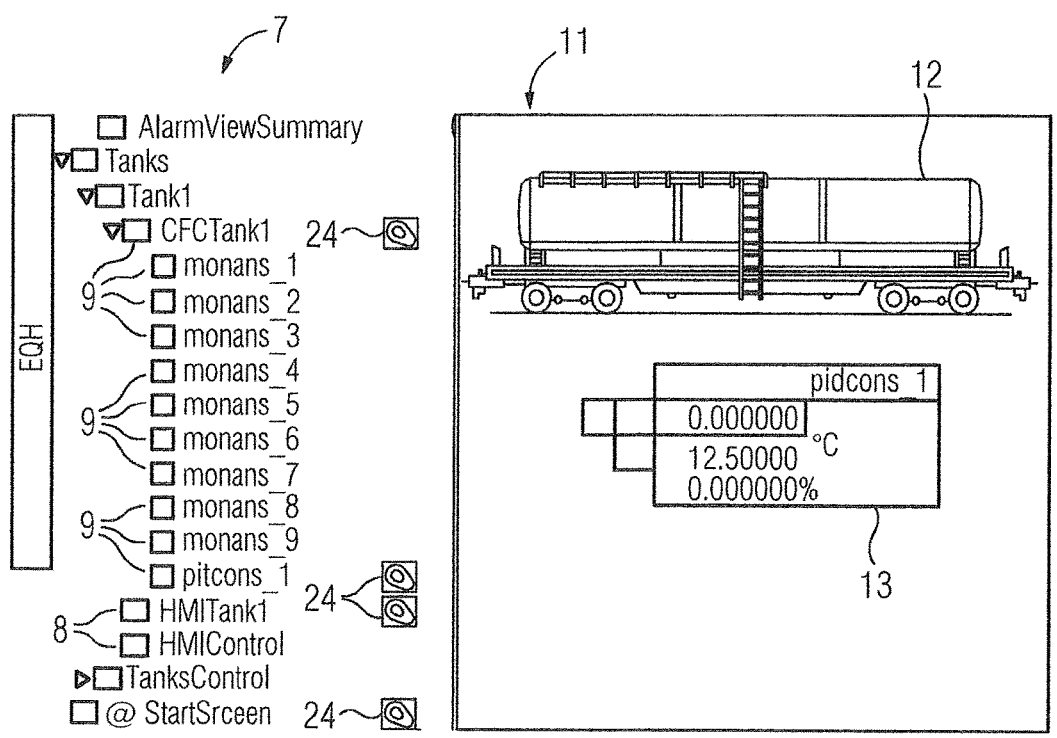
FIG. 2 shows an equipment hierarchy and a system image in accordance with the invention.
Figure 3:
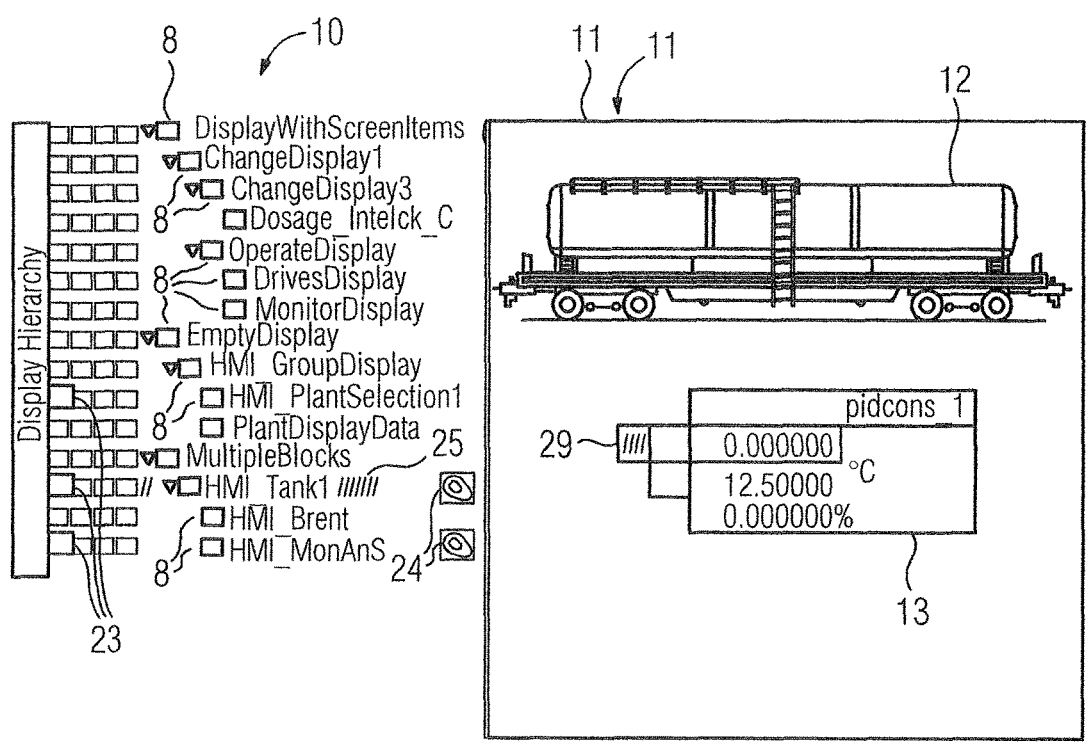
FIG. 3 shows an image hierarchy and a system image in accordance with the invention.

The same parts shown in FIGS. 1 to 3 are provided with the same reference characters.

Components of a process control system which, in the present exemplary embodiment, comprise operator server 2, 3 and an automation device 4 and an operator client 5, are designated with 1 in FIG. 1. The process control system can naturally have a plurality of automation devices which, on the one hand, are connected via a plant bus 6 to the operator servers 2, 3 and, on the other hand, via a further bus, not shown here, to decentralized peripherals, to which a plurality of field devices (sensors, actuators) are connected. In the present example, only one operator client 5 is shown. Naturally, further OS clients can be provided, where typically one operator server including a processor and memory, and one operator client each form one operator system or one operator station in each instance.

Using suitable software of an engineering system of the process control system (not shown here), a user produces an equipment hierarchy (EQH) 7 (FIG. 2), which represents a technological view of a technical system to be controlled. In this equipment hierarchy 7, nodes 8, 9 are entered or stored in a structured manner in accordance with a tree structure, of which the nodes 8 represent system images, e.g. "HMI-Tank1" and "HMIControl", and the nodes 9 represent CFC plans and process objects, such as monitoring and control objects ("monans_1", . . . , "pidcons_1").

Using the cited or further suitable software of the engineering system, the user also produces an image hierarchy (display hierarchy) 10 (FIG. 3), in which nodes 8 that represent system images, e.g., "HMI_Brent" and "HMI_MonAnS") are likewise entered or stored in a structured manner.

The respective system images can be opened online, i.e., during the process control by, for process monitoring purposes, an operator selecting in each case the corresponding system image node 8 of the equipment hierarchy 7 or the image hierarchy 10 or clicking thereon by means of a "mouse", as a result of which the system image associated with the selected system node is opened and displayed on the operator client 5. The present example shows a cutout of a system image 11, which comprises a graphical image symbol 12 and a block symbol 13 associated with a process object, where the block symbol 13 is provided for process monitoring and indicates current process values, parameters and alarm identifiers 29 of this process object during the process control.

With respect to process management, the operator can influence, e.g., this process object, by changing the target value and/or further parameters, by selecting or "clicking on" the corresponding node 9 for this process object in the equipment hierarchy 7. As a result, a faceplate (not shown here) associated with this process object and provided for process management is opened and displayed on the operator client 5, where this faceplate has corresponding fields for entering, changing and/or deleting parameters of the process object.

It is noted that the term "process object" is understood to mean the respective facets of a process object, which are stored in the operator client 5, in a process image 14 of the operator server 2 and in the automation device 4. The process image 14 of the operator server 2 of the operator system therefore has a process image module 15 associated with this process object, the automation device 4 has an automation module 16 associated with this process object and further a user interface 26 of the operator client 5 has a faceplate 17 and block symbol 18 of a system image 27 that is associated with this process object.

In order to permit an efficient coordination of operator accesses, the operator servers 2, 3 have a first component 19, which interacts with the user interface 26. This first component 19 is configured to determine the process objects comprising project-planning data available on all operator servers 2, 3 in the process control system, where the process objects transmits the engineering system to the respective operator server 2. Furthermore, the operator servers 2, 3 are provided with a second component 20, which is configured to reproduce all alarms of the respective process objects, which sound during the process control, onto an alarm tag 21 of the process image module 15 of the process image 14 that is associated with the respective process object. These alarms indicate process malfunctions and are transmitted via the automation module/s 16 of the automation device 4 to the respective operator server 2, 3.

In the event that the first component 19 queries the second component 20 about the process objects, determined by the first component 19, for which there is a notification of the alarm tag 21, which indicates an operator access to these process objects or an operator action, the first component 19 identifies these process objects in the equipment hierarchy 7 and/or in the image hierarchy 10 using a suitable marker 24 (FIGS. 2 and 3). A notification for the alarm tag 21 then exists if an operator opens a system image in which the block symbol associated with this process object is faded in or if an operator opens the faceplate for this process object in order to operate the same. This automatically identifies the process objects with which operators are currently interacting. The first component (19) is informed of changes to the alarm tag 21 via the second component (20).

The second component 20, which is configured to reproduce all alarms of the respective process objects that sound during the process control on an alarm tag 21 of the process image module 15 of the process image 14 that is associated with the respective process object, is also configured to determine the system image (primary screen 22) assigned primarily to an alarm-giving process object, where, e.g., the system image 27 of the operator client 5 associated with this primary screen 22 can be displayed. The primary screen 22 represents the system image 27, for the alarm of which the process object is alarm-giving in the image hierarchy, as a result of which the connection between process object and system image can be established. A further component 28 can be used to collect this information on each operator server 2, 3 and provide the information for each operator client 5.

Reference is made below to FIGS. 2 and 3, in which during run-time or during the process control the markers 24 identify which process objects the operators are currently accessing, where, e.g., a marked process object "pidcons_1" in the equipment hierarchy 7 is also shown as a block symbol 13 in the system image 11 (FIG. 2).

On account of the representation of the operator actions, an optimized coordination of the operation and monitoring in the image hierarchy 10 and/or equipment hierarchy 7 is enabled during the run-time. In the present example, in which alarms are identified with 23 (FIG. 3), an operator has just opened the system image "HMITank1", which is shown in FIG. 3 via a hatching 25, in order to operate the alarm-giving process object therein. At the indicated marker 24 in the image hierarchy 10, this operator can immediately identify that another operator is currently processing an alarm in the system image "HMI_MonAnS" and no other operator is processing the alarm 23 in the system image "HMI_PlantSection1". Without consultation between the operators, the operators can identify which alarm-giving process objects are still to be processed, where measures can be provided to guide operators not participating in a process management to the points in the image hierarchy 10 at which operations are required for alarm processing or alarm elimination.

Figure 4:
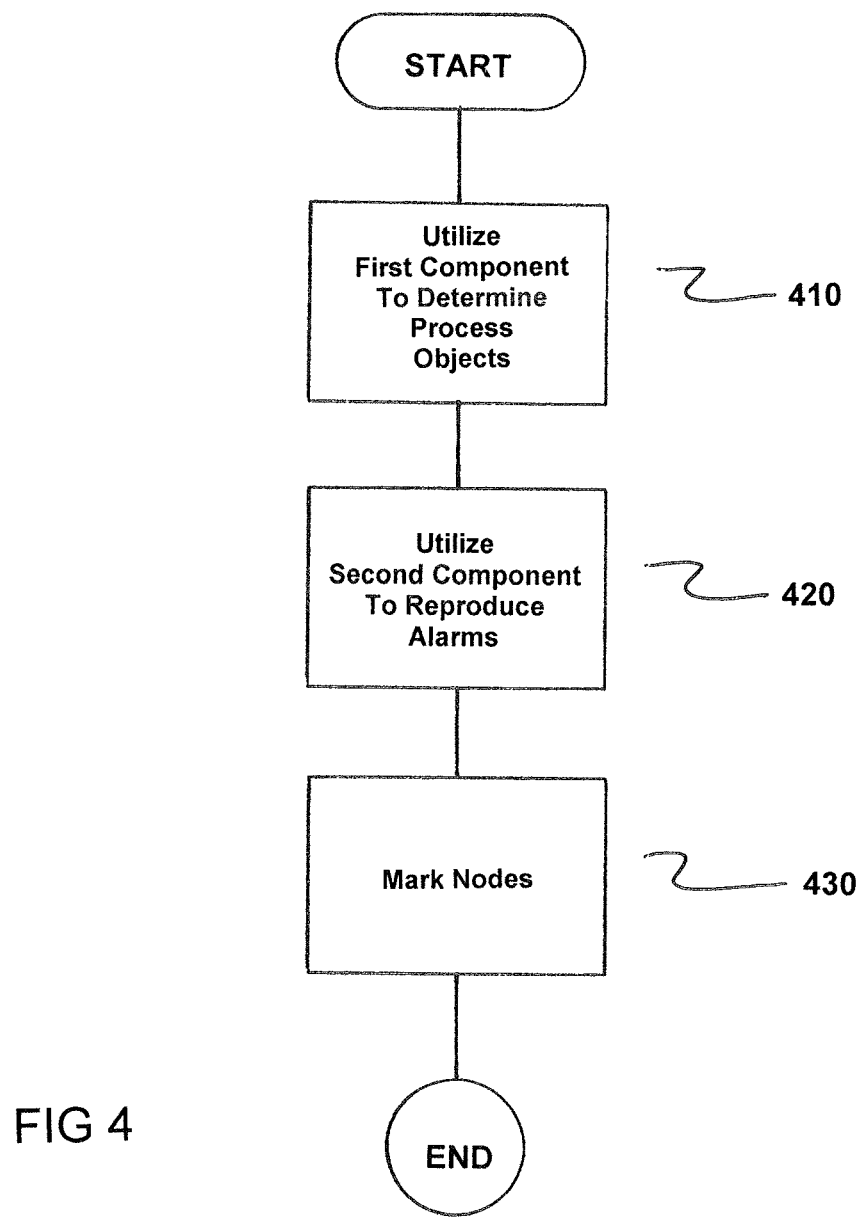
FIG. 4 is a flowchart of the method in accordance with the invention.

FIG. 4 is a flowchart of a method for identifying and displaying operator accesses to process objects within the scope of process management and process monitoring, where at least one operator server 2, 3 of a process control system includes a process image 14, which is provided with process image modules 15 associated with process objects, at least one automation device 4 is provided with automation modules 16 associated with the process objects, a user interface 26 is provided with block symbols 13, 18 of system images 11 that are associated with the process objects for process monitoring, the user interface 26 is provided with faceplates 17 associated with the process objects for process management, and where a node 8, 9 that is selectable by a user is stored in at least one of (i) an image hierarchy 10 and (ii) an equipment hierarchy 7 in order to open system images 11 for representation on a display for the respective system image. Here, a system image 11 comprises graphical image symbols 12 and the block symbols 13 associated with the process objects.

The method comprises utilizing a first component 19 of the operator server 2, 3 to determine the process objects from project-planning data of an engineering system of the process control system, as indicated in step 410.

Next, a second component 20 of the operator server 2 is used utilized to reproduce alarms of receptive process objects on an alarm tag 21 of the process image module 15 associated with a respective process object, as indicated in step 420. Here, the alarms indicate process malfunctions and being are transmitted to the operator server via the automation modules 16 of the automation device 4.

Next, nodes 8, 9 in at least one of (i) the image hierarchy 10 and (ii) the equipment hierarchy 7 that comprise an alarm-giving process object are marked, in an event that an operator selects a node 8, 9 of this type, as indicated in step 430. Here, the selected node 8, 9 is marked with a further identifier 24.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for identifying and displaying operator accesses to process objects within the scope of process management and process monitoring, at least one operator server of a process control system including a process image, which is provided with process image modules associated with process objects, at least one automation device being provided with automation modules associated with the process objects, a user interface being provided with block symbols of system images which are associated with the process objects for process monitoring, and the user interface being provided with faceplates associated with the process objects for process management, a node which is selectable by a user being stored in at least one of (i) an image hierarchy and (ii) an equipment hierarchy in order to open system images for representation on a display for the respective system image, a system image comprising graphical image symbols and the block symbols associated with the process objects, the method comprising:

utilizing a first component of the operator server to determine the process objects from project-planning data of an engineering system of the process control system;

utilizing a second component of the operator server to reproduce alarms of receptive process objects on an alarm tag of the process image module associated with a respective process object, the alarms indicating process malfunctions and being are transmitted to the operator server via the automation modules of the automation device; and marking nodes in at least one of (i) the image hierarchy and (ii) the equipment hierarchy which comprise an alarm-giving process object, in an event that an operator selects a node of this type, said selected node being marked with a further identifier.

2. The method as claimed in claim 1, wherein the second component is utilized to inform the first component of changes to the alarm tag.

3. The method as claimed in claim 1, wherein the second component is utilized to determine a system image primarily assigned to the process object.

4. The method as claimed in claim 2, wherein the second component is utilized to determine a system image primarily assigned to the process object.

5. An operator system for a process control system, the system comprising:

an operator server including a process image, which is provided with process image modules associated with process objects;

a user interface of an operator client of the operator system provided with block symbols of system images which are associated with the process objects for process monitoring, the user interface being further provided with faceplates associated with the process objects for process management the user interface; and a node which is selectable by a user and stored in at least one of (i) an image hierarchy and (ii) in an equipment hierarchy for opening the system images for representation on a display of the operator client for the respective system image, the system image comprising graphical image symbols and the block symbols associated with the process objects;

wherein a first component of the operator server is configured to determine the process objects from project-planning data of an engineering system of the process control system;

wherein a second component of the operator server is configured to reproduce alarms of respective process objects on an alarm tag of a process image module associated with the respective process object, the alarms indicating process malfunctions, which transmits automation modules of an automation device associated with the process objects to the operator server; and wherein the first component is configured to mark the nodes in at least one of (i) the image hierarchy and (ii) the equipment hierarchy, which comprise an alarm-giving process object, in an event that an operator selects a node of this type, said selected node being marked with a further identifier.

6. The operator system as claimed in claim 4, wherein the second component is configured to inform the first component of changes to the alarm tag.

7. The operator system as claimed in claim 4, wherein the second component is further configured to determine a system image primarily assigned to the process object.

8. The operator system as claimed in claim 5, wherein the second component is further configured to determine a system image primarily assigned to the process object.

* * * * *